O. O. NYGAARD.
COMPOUND ROTARY STEAM ENGINE.
APPLICATION FILED AUG. 3, 1909.

952,465.

Patented Mar. 22, 1910.
8 SHEETS—SHEET 1.

WITNESSES:
F. W. Townsend
W. H. Winthrop

INVENTOR:
Oscar O. Nygaard.
By Charles T. Hannigan,
ATTORNEY.

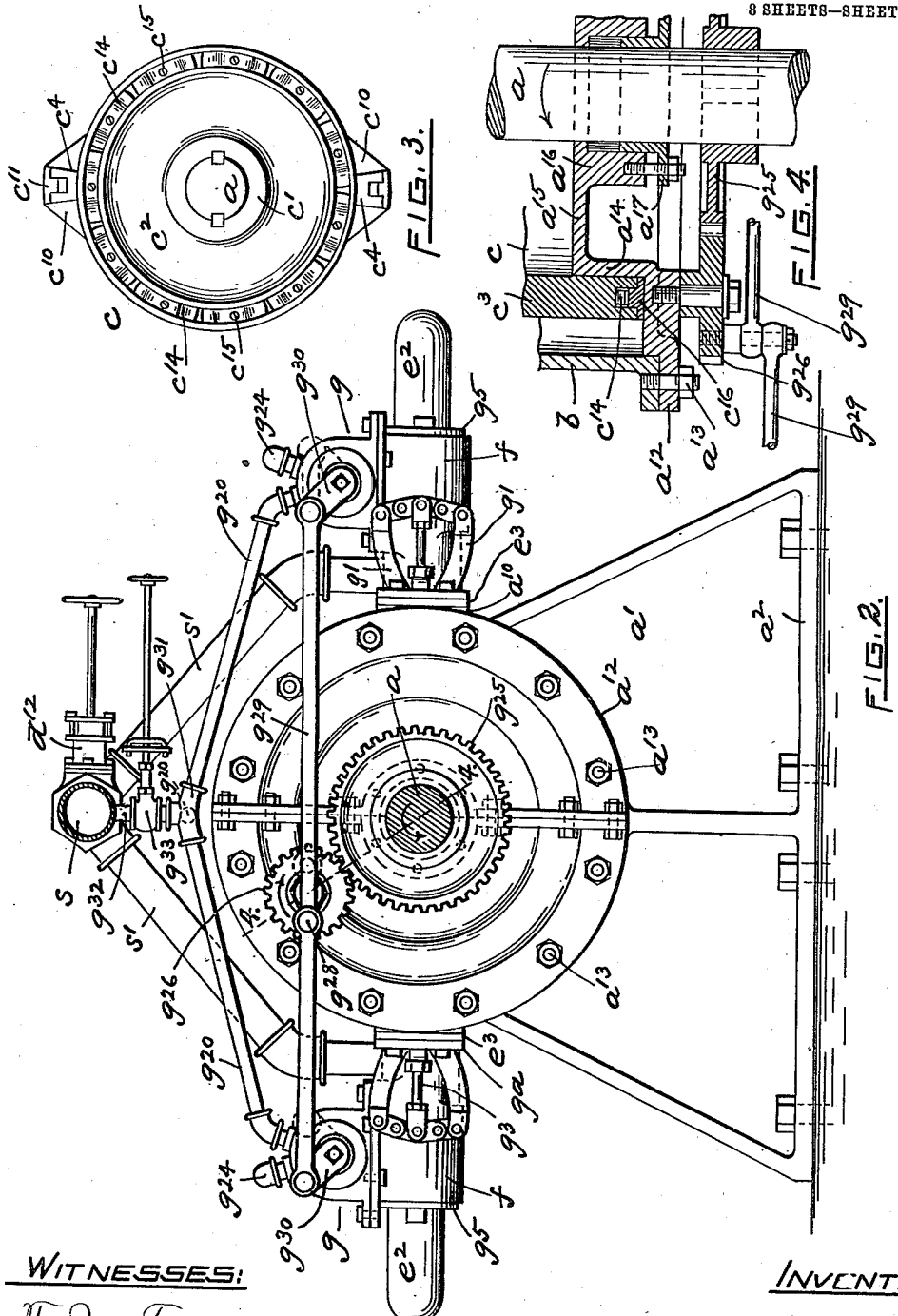

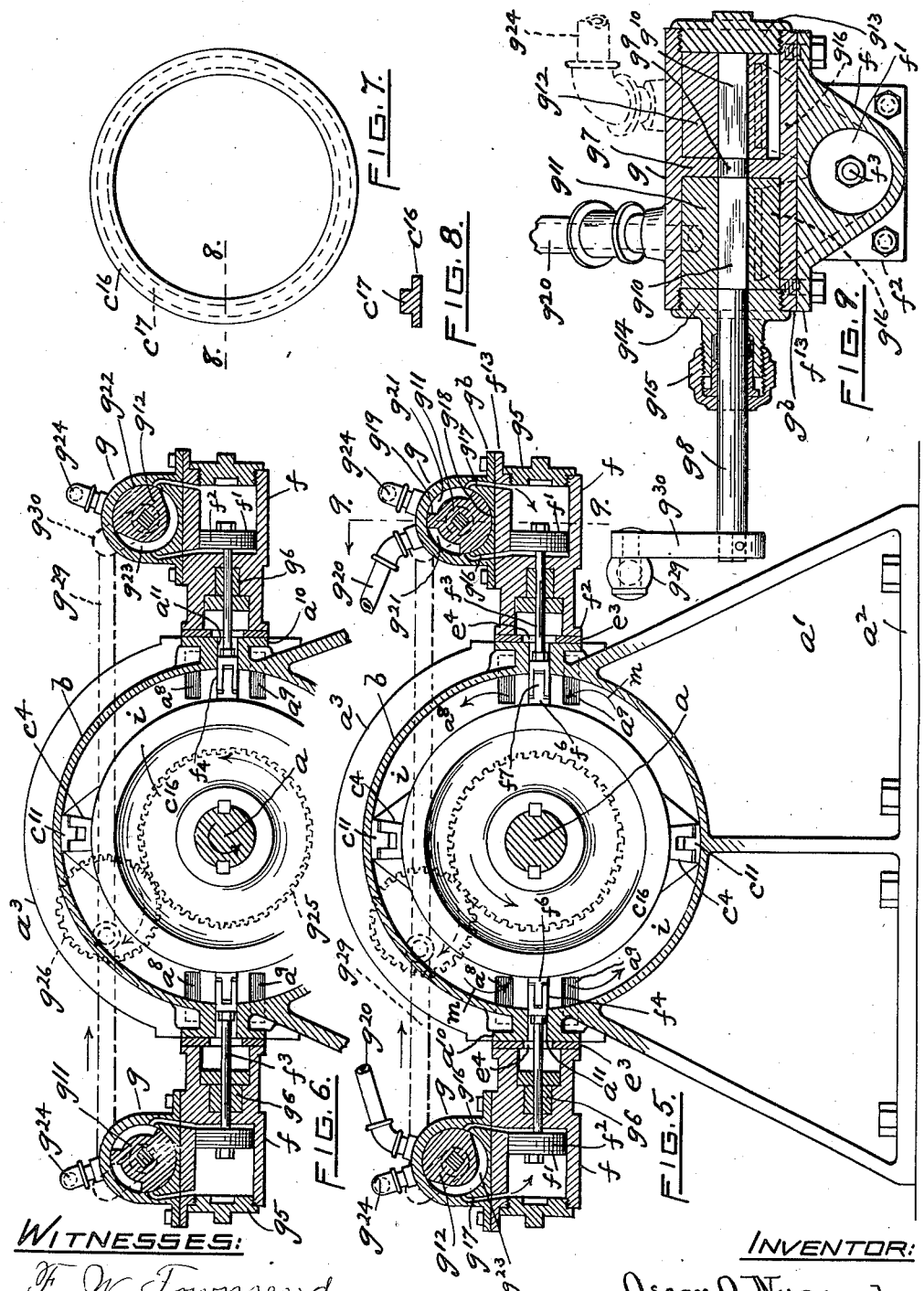

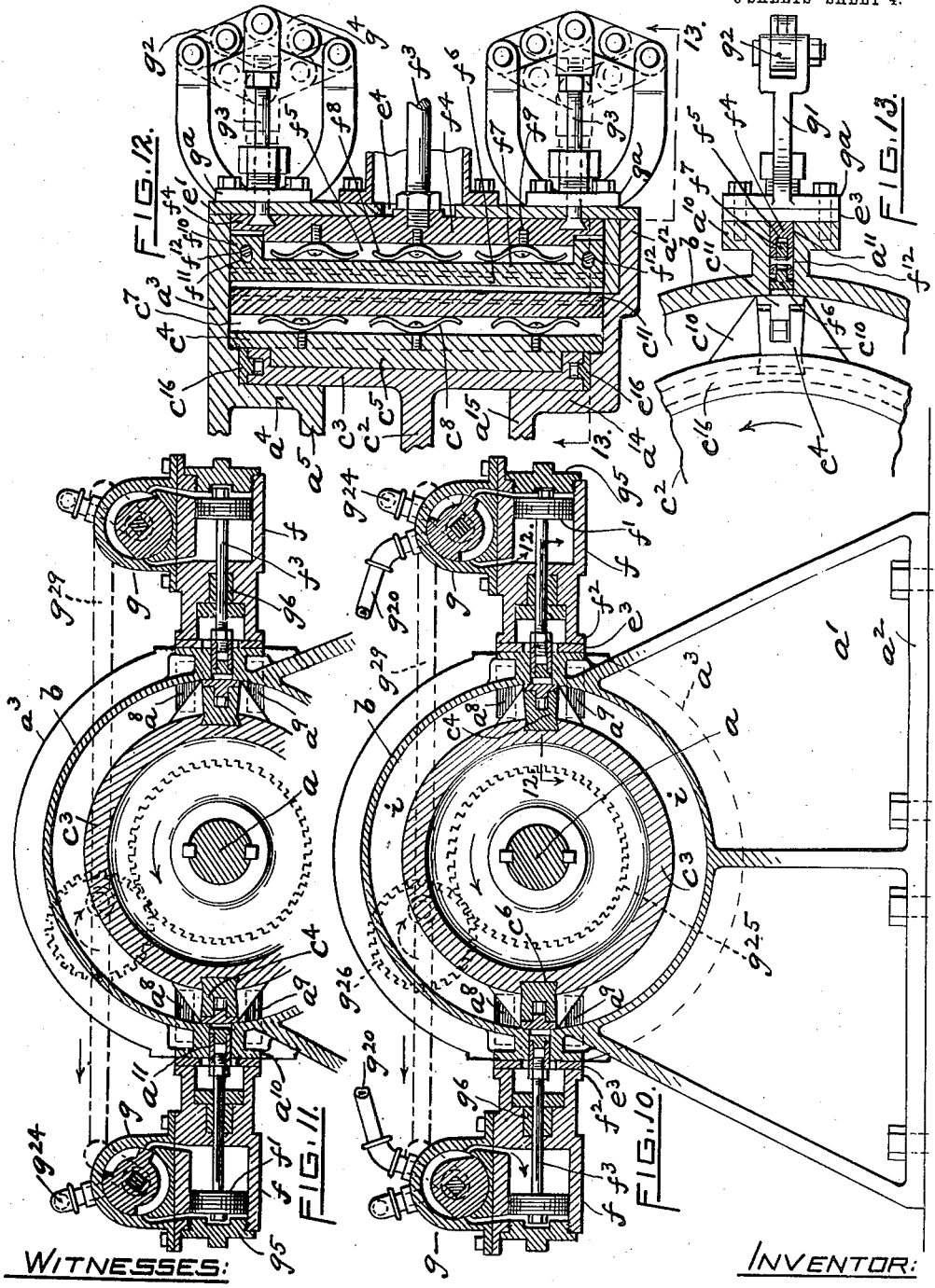

O. O. NYGAARD.
COMPOUND ROTARY STEAM ENGINE.
APPLICATION FILED AUG. 3, 1909.

952,465.

Patented Mar. 22, 1910.
8 SHEETS—SHEET 5.

WITNESSES:
F. W. Townsend
W. L. Martin

INVENTOR:
Oscar O. Nygaard,
By Charles T. Hannigan,
Attorney.

O. O. NYGAARD.
COMPOUND ROTARY STEAM ENGINE.
APPLICATION FILED AUG. 3, 1909.

952,465.

Patented Mar. 22, 1910.

8 SHEETS—SHEET 6.

WITNESSES:
F. W. Townsend
W. H. Winthrop

INVENTOR:
Oscar O. Nygaard,
By Charles T. Hannigan,
ATTORNEY.

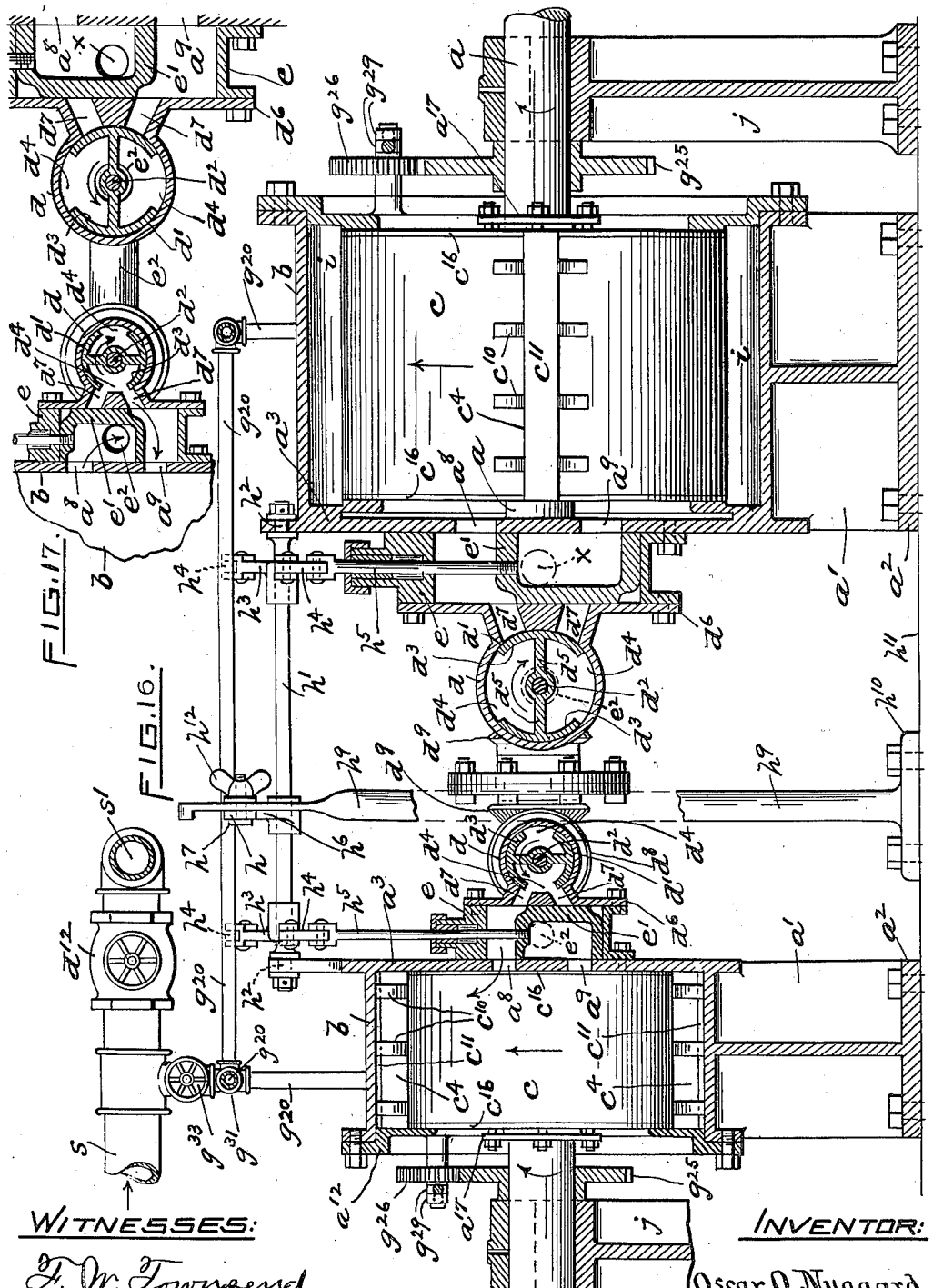

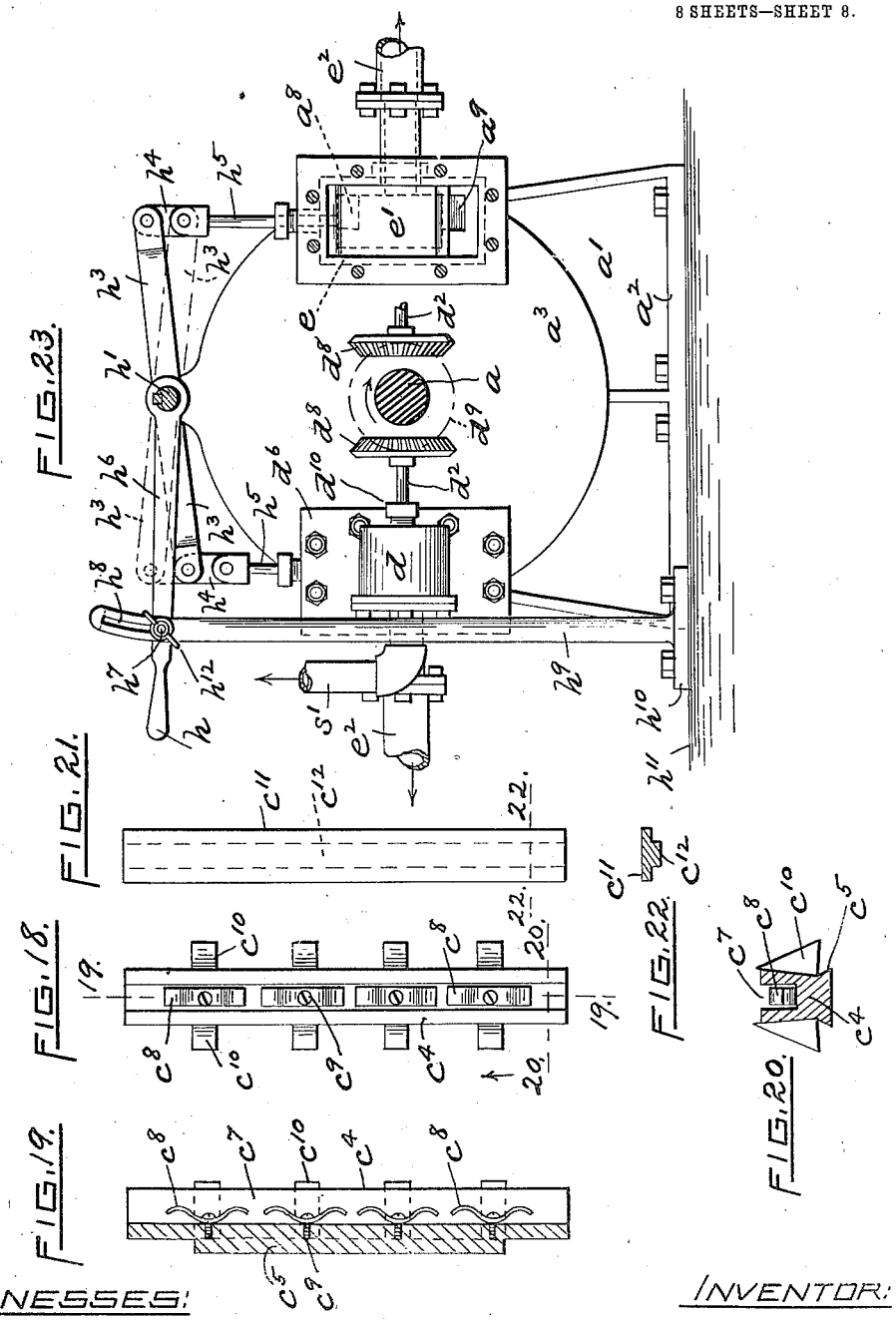

UNITED STATES PATENT OFFICE.

OSCAR O. NYGAARD, OF NEWPORT, RHODE ISLAND.

COMPOUND ROTARY STEAM-ENGINE.

952,465.   Specification of Letters Patent.   Patented Mar. 22, 1910.

Application filed August 3, 1909. Serial No. 511,054.

*To all whom it may concern:*

Be it known that I, OSCAR O. NYGAARD, a citizen of the United States, residing at the city of Newport, in the county of Providence and State of Rhode Island, have invented certain new and useful Improvements in Compound Rotary Steam - Engines, of which the following is a specification.

My invention relates to rotary engines of the class in which steam is used as a motive force against the revolving piston or rotor; and it consists of a compound engine, the structural parts of one engine being substantially the same as the other engine, one structure acting as a high pressure engine and the other structure acting as a low pressure engine, and the latter driven by the exhaust of the former, automatic means to cut off the main steam pressure during an approximate half revolution of the engine, and means to permit the engine to run in either direction.

The objects of my invention are to provide an improved engine which is equally steam-balanced, so that it has equal power, the full revolution, will start with equal power at all points, which shall be efficient and reliable in operation, and economical in the use of steam.

With these objects in view, and such others as pertain to my invention, it consists in certain novel features of construction, arrangement, and combination of parts, as hereinafter described and claimed.

Figure 1:
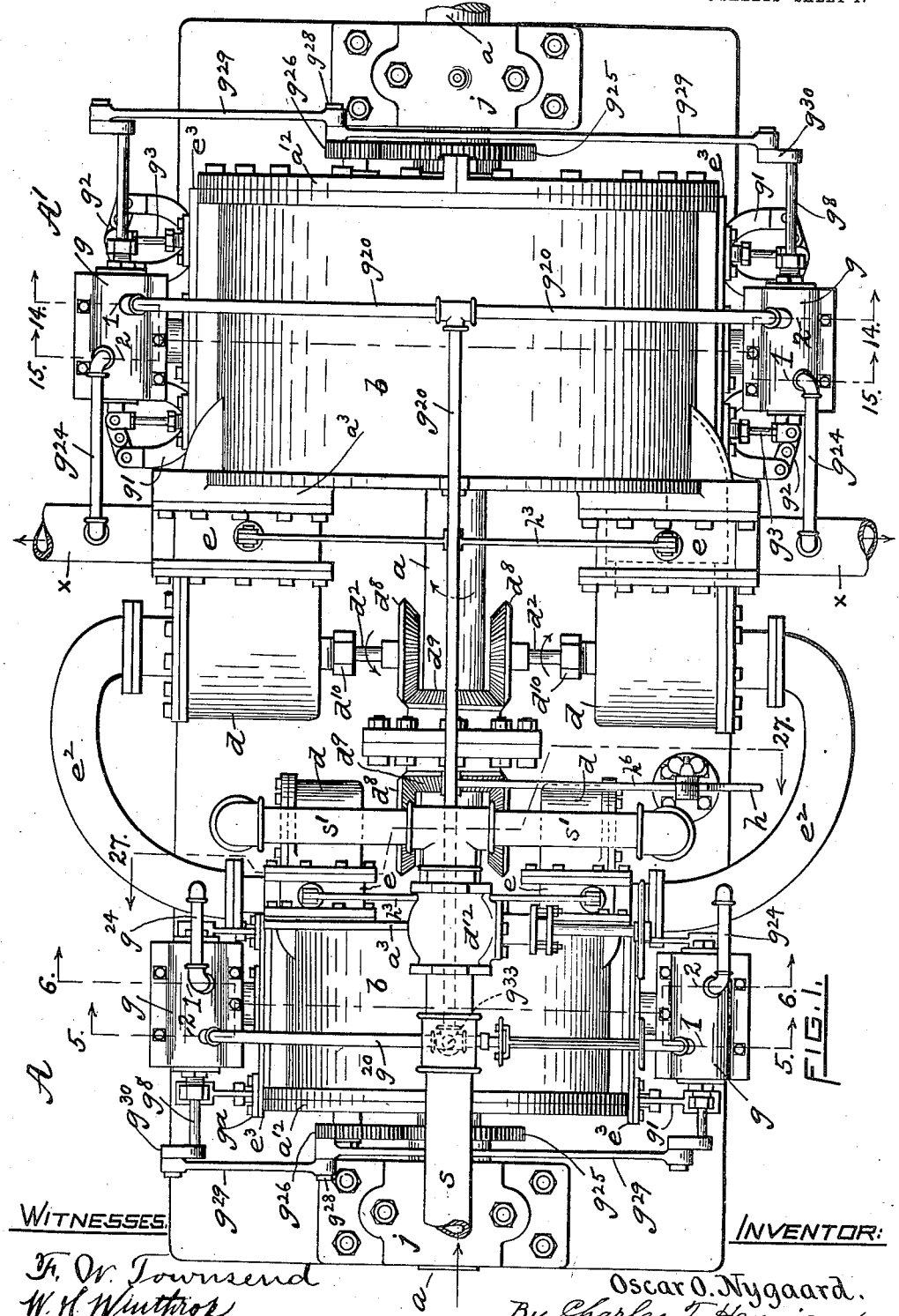
Figure 14:
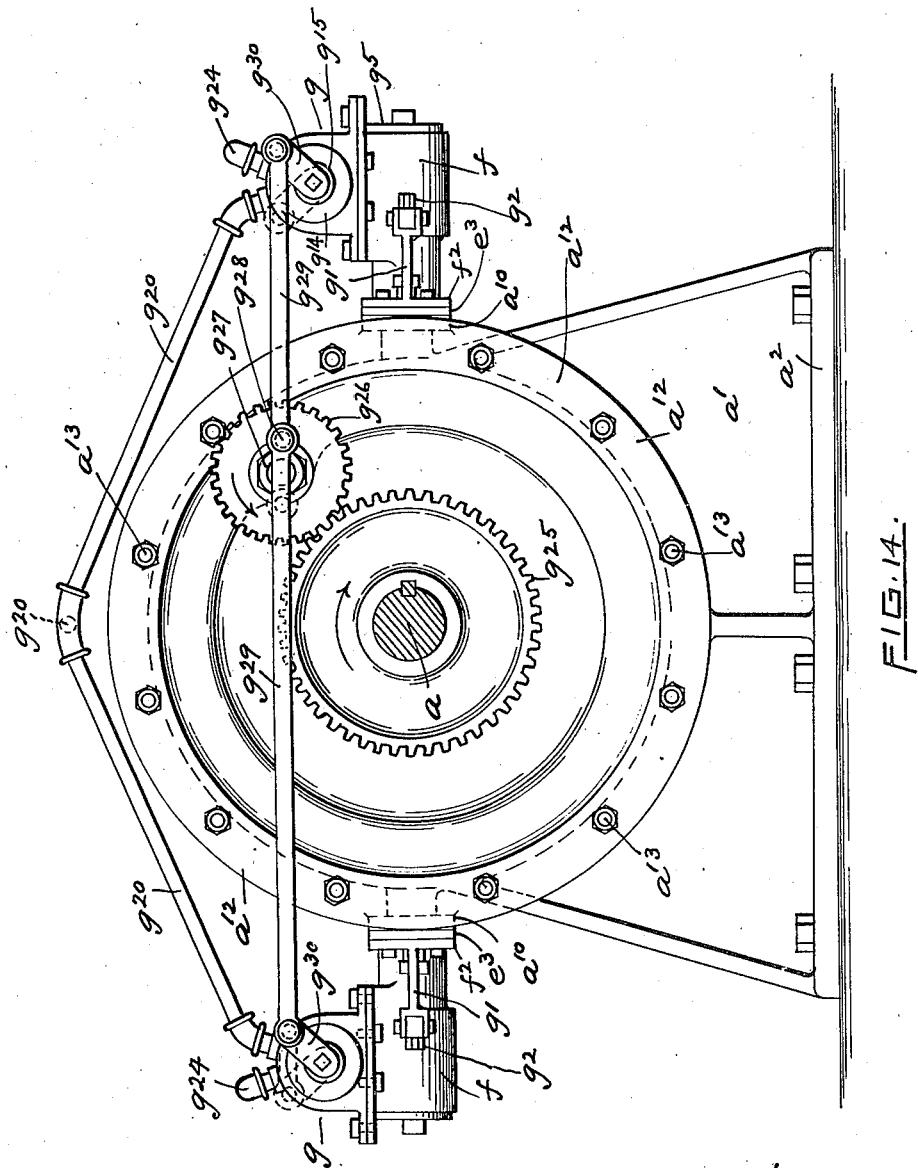
Figure 15:
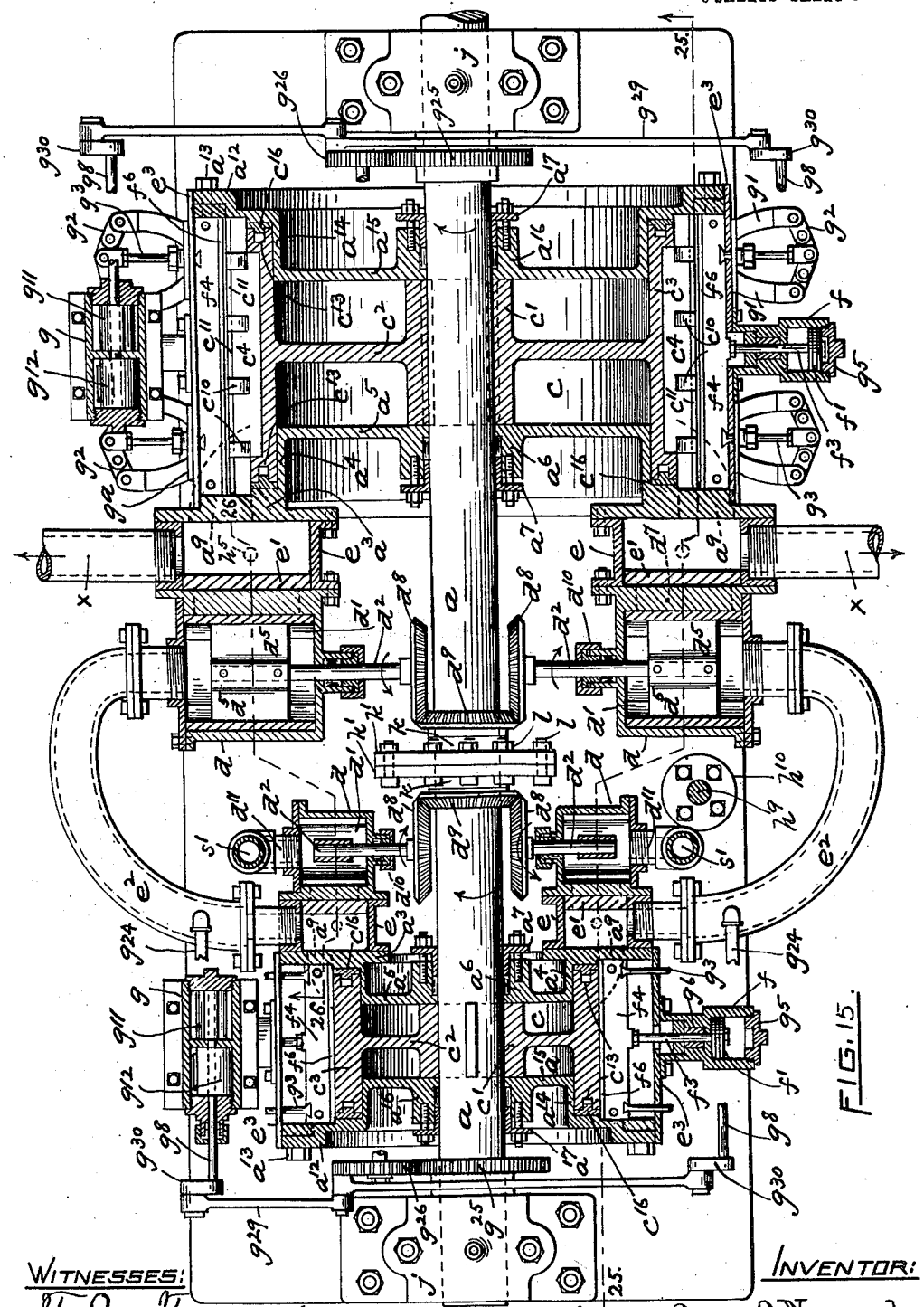

In the accompanying drawings, Figure 1 represents a plan view of my improved rotary engine as compounded and constructed in accordance with my invention. Fig. 2 is an end view of the high pressure engine, showing the main steam pipe connections therefor, and the gearing arrangement for actuating the main steam cut off mechanism. Fig. 3 is a face view of the main piston or rotor of the high pressure engine, showing its steam abutments provided with spring-pressed packing-blades, and also arrangement of springs to force against packing-rings, the latter being removed. Fig. 4 is a detail section taken on line 4.—4. of Fig. 2, showing the gears for actuating the rocker-valves of the steam cut off mechanism. Fig. 5 is a transverse sectional view of the high pressure engine, taken on line 5.—5. of Fig. 1, showing one pair of oppositely disposed rocker-valves of the steam cut off mechanism, after steam has been admitted to the front of jumper-pistons, to cause spring-pressed packing-blades of the latter to cut off the main steam pressure between the rotor steam-abutments, shown at half stroke or vertical mid-position in the engine-cylinder. Fig. 6 is a similar view taken on line 6.—6. of Fig. 1, showing the relative position of another pair of oppositely disposed rocker - valves, after steam has exhausted from the front of the jumper-pistons. Fig. 7 is a face view of one of the packing-rings for the rotor of the high pressure engine. Fig. 8 is a section of the ring taken on line 8.—8. of Fig. 7. Fig. 9 is a detail sectional view of one steam cut off mechanism taken on line 9.—9. of Fig. 5, showing one pair of rocker-valves, and steam inlet and exhaust pipe connections, and jumper-piston. Fig. 10 is a sectional view taken on line 5.—5. of Fig. 1, showing the relative position of parts, after steam has been admitted to the rear of the jumper-pistons and the blades of the latter carried free from the path of the rotor steam-abutments, which are shown in horizontal position or dead-center line of the engine. Fig. 11 is a similar view taken on line 6.—6. of Fig. 1, showing the relative position of parts, after steam has exhausted from the rear of the jumper-pistons. Fig. 12 is a plan sectional view taken on line 12.—12. of Fig. 10, showing the arrangement of spring-pressed packing-blades for the rotor and jumper-pistons, and also means to guide the said packing-blades evenly in their reciprocating movement. Fig. 13 is a detail sectional view taken on line 13.—13. of Fig. 12. Fig. 14 is an end elevation of the low pressure engine, showing the gearing arrangement for actuating the main steam cut off mechanism, and the small steam pipe and exhaust pipe connections therefor. Fig. 15 is a plan of the compound engine, partly in section and partly in elevation, showing the relative position of operating parts and corresponding to Fig. 1. Fig. 16 is a side sectional view of the compound engine taken on line 25.—25. of Fig. 15, showing main rotary steam-valves, one extreme position of their adjacent steam slide-valves, and hand-operating means to move said slide-valves. Fig. 17 is a side sectional view taken on line 26.—26. of Fig. 15, showing the other extreme position of the slide-valves. Fig. 18 is a plan view of one of the rotor steam-abutments, showing arrangement of springs to force against the packing-blade, the latter being removed. Fig. 19 is a sectional view taken on line 19.—19. of Fig. 18. Fig. 20 is a transverse section of the steam-abutment taken on line 20.—20. of Fig. 18. Fig. 21 is a plan view of the packing-blade for the steam-abutment. Fig. 22 is a cross-section of the blade, as seen on line 22.—22. of Fig. 21. Fig. 23 is an end sectional view taken on line 27.—27. of Fig. 1, showing the hand-lever and its connections for reversing the movement of the compound engine. The direction in which the sectional figures are viewed is indicated by arrows at the lines specified.

Like reference characters indicate like parts throughout the views.

For the purpose of attaining the highest economy in the use of steam to drive my improved engine I compound the engine as shown, one engine acting as the high pressure engine, as A in Fig. 1, and the other engine, whose cylinder is somewhat larger in size than the cylinder of former engine, acting as a low pressure engine, as $A^1$, and adapted to be driven by the exhaust of said high pressure engine, and steam is admitted into each cylinder twice per revolution, so that the speed, and steam pressure are the same in both engines and the volume of steam used and the power developed by the engines are substantially the same.

Referring to Figs. 1 and 15, for the purpose of attaining brevity in the description, $a$ designates the engine-shaft; $b$ the engine-cylinder concentric to said shaft; $c$ the rotor; $d$, $d$ the cases for inclosing the main rotary steam-valves; $e$, $e$ the chests for inclosing the steam slide-valves; $f$, $g$ the case and cylinder respectively for inclosing the jumper-piston and rocker-valves of the steam cut off mechanism, and $h$ the hand-lever for reversing the rotative movement of the engine.

In construction the cylinder $b$ is made in one casting, having a depending support $a^1$ that terminates with a base $a^2$, as shown in Fig. 5, and a head $a^3$ is located at the rear end of said cylinder and projects beyond the outer peripheral surface of the latter, and from at a point within the cylinder said head $a^3$ extends inwardly and longitudinally in the form of an annular flange $a^4$ which terminates with a wall $a^5$ arranged transversely of the cylinder and having a hub $a^6$ bored to receive a packing and gland $a^7$, to act as a stuffing-box surrounding the engine-shaft, in the manner shown in Fig. 15. The head $a^3$ is provided with four ports $a^8$, $a^8$ and $a^9$ $a^9$ communicating within the cylinder $b$ and near the shell thereof, and each pair of ports $a^8$ and $a^9$ are located diametrically opposite each other and near to the horizontal axial center of the cylinder, as shown in Fig. 5, and either pair of these diametrically opposite ports become steam inlets and exhausts in reversing the motion of the engine. At each side of the cylinder $b$ projects a flange-head, as at points $a^{10}$, $a^{10}$, and each flange-head is provided with a narrow slotted opening $a^{11}$ extending the full length of the cylinder, and on the line of horizontal axial center thereof, to receive a sliding movement therethrough of the packing-blade structure of the jumper-pistons, presently described.

The front end of the cylinder $b$ is closed by a bonnet $a^{12}$ which is secured in place by bolts $a^{13}$, and said bonnet is the same size in diameter as the head $a^3$ of said cylinder and the same contour as said head, having an inwardly and longitudinally extending flange $a^{14}$ to register with the corresponding annular flange $a^4$ of said head and a wall $a^{15}$ which terminates with a hub $a^{16}$ that is bored to receive a packing and gland $a^{17}$, to act as a stuffing-box surrounding the engine-shaft.

The rotor $c$ is a cylindrical casting, having a central hub $c^1$ keyed to the engine-shaft and of a length to fit between the wall $a^5$ of the cylinder-head $a^3$ and wall $a^{15}$ of the cylinder-bonnet $a^{12}$, and centrally of said hub is a web $c^2$ that terminates with a deep annular wall $c^3$, which rests upon the surfaces of the annular flanges of said cylinder-head and its bonnet. The annular wall $c^3$ of the rotor is of a length to extend near to the wall $a^5$ of the cylinder-head and wall $a^{15}$ of the bonnet, and of a depth to be clear of the ports $a^8$ and $a^9$.

The rotor is provided with two diametrically opposite steam abutments, the structural parts of which are shown by Figs. 18 to 22 inclusive, and in which $c^4$ is the steam wall-abutment of a length to extend between the cylinder-head and its bonnet, said abutment having a ledge $c^5$ to snugly fit within a dove-tail groove formed in the annular wall $c^3$ of the rotor and extending longitudinally of the latter, as at a point $c^6$ in Fig. 10, and said abutment $c^4$ is provided with a channel $c^7$ to receive upwardly curved springs $c^8$, $c^8$, which are secured to said abutment by screws $c^9$, $c^9$. This wall-abutment has a series of integral ribs $c^{10}$, $c^{10}$ projecting from its sides and having their edges inclined from at a point on the outer surface of the annular wall $c^3$ of the rotor and inwardly to the shell of the engine-cylinder, for the purpose of giving stability in holding the wall-abutment rigid against the steam pressure. A packing-blade $c^{11}$ rests upon the top faces of the wall-abutment $c^4$ and of the same length as the latter and said blade has a ledge $c^{12}$ to rest upon the springs $c^8$, so that the latter cause said blade to bear in frictional contact upon the engine-cylinder.

Each face of the annular wall $c^3$ of the rotor $c$ is provided with a channel, as at points $c^{13}$, $c^{13}$ in Fig. 15, to receive therein upwardly curved springs $c^{14}$, $c^{14}$ which are secured to said wall by screws $c^{15}$, $c^{15}$, as shown in Fig. 3. Packing-rings $c^{16}$, $c^{16}$ have each a concentric ledge $c^{17}$ to rest upon the springs $c^{14}$ of the rotor-wall $c^3$, and thereby force said rings in frictional contact upon the surfaces of the cylinder-head $a^3$ and bonnet-head $a^{12}$, in the manner shown in Figs. 7, 8 and 15.

In each case $d$ is mounted a cylindrical rotary-valve $d^1$ having a short central hub in which is made fast a horizontal shaft $d^2$ whose axial center is in alinement with and at right angles to the engine-shaft $a$. Each rotary-valve $d^1$ disposes two opposite segmental flanges $d^3$, $d^3$ in order to provide therebetween main steam ports $d^4$, $d^4$, as shown in Fig. 16, and said flanges $d^3$ extend the full length within each case $d$ and are integral with short webs $d^5$, $d^5$ of the hub of each rotary-valve, as shown in Fig. 24. Each case $d$ has a vertical head $d^6$ which is bolted to the chests $e$, $e$ containing the slide-valves, and each head $d^6$ is provided with two ports $d^7$, $d^7$ extending longitudinally of the latter and communicating with the interior of each case $d$, and, as seen in Fig. 16, each port $d^7$ extends radially from the center of the valve-shaft $d^2$ and communicates with the interior of either valve-chest $e$. Each valve-shaft $d^2$ has a miter gear $d^8$ fast thereon and each gear meshes with a miter gear $d^9$ fast on the engine-shaft $a$, and thus the rotary-valves are caused to rotate at uniform speed. Each case $d$ is provided with a stuffing-box $d^{10}$ surrounding each valve-shaft $d^2$.

Referring to Fig. 1, $s$ is the main steam pipe, which extends centrally and longitudinally of the engine and unites with transverse branch connections $s^1$, $s^1$ whose ends communicate within the cases $d$, $d$ of the rotary-valves $d^1$, $d^1$, as at points $d^{11}$, $d^{11}$ in Fig. 15. The branch pipe $s$ is provided with an ordinary throttle-valve $d^{12}$ for regulating the supply of steam to the engine.

Referring to Fig. 16, each steam-chest $e$ is bolted to the cylinder-head $a^3$, each chest having a rectangular opening therethrough for the vertical movement of each slide-valve $e^1$, which is substantially C-shaped in normal vertical position, the vertical portion of said slide-valve $e^1$ bearing against the head $d^6$ of the valve-case $d$ and of a height to cover port $d^7$, while the lateral extensions of said slide-valve $e^1$ are distanced apart to permit the steam pressure to pass from the open port of the valve-case $d$, through the space left between the valve-chest $e$ and slide-valve $e^1$, through one port $a^8$ of the engine-cylinder and against one of the wall-abutments $c^4$ of the rotor $c$, while the exhaust from the latter passes through the other port $a^9$ of the engine-cylinder, through the slide-valve $e^1$, and out through either exhaust-pipe $e^2$, one end of which communicates within either chest $e$ and its other end communicating with the interior of either rotary-valve-case $d$ of the low pressure engine $A^1$, in the manner shown in Figs. 15 and 16.

The construction of the steam cut off mechanism, of which two alike structures are employed on each engine, is as follows: On each flange-head $a^{10}$ of the engine-cylinder is secured a plate $e^3$, of the same size as the flange of said head, and said plate is provided with a central opening $e^4$, for the movement therethrough of the rod of the jumper-piston, in the manner shown in Figs. 5 and 12. $f$ designates the case for inclosing the reciprocating jumper-piston $f^1$ whose axial center is at a right angle to the axial center of the engine-shaft $a$, and said case has a flange-head, as at $f^2$ in Fig. 9, and through which head bolts pass for securing said case to the plate $e^3$. The jumper-piston $f^1$ fits the bore of the case $f$ and is provided with the usual packing-rings, as at $f^2$ in Fig. 5, and the rod $f^3$ has one end centrally secured through said piston and its other end centrally secured to a cross-bar $f^4$ slidable in the slotted opening $a^{11}$ of the flange-head $a^{10}$, said bar being of a length to extend between the cylinder-head $a^3$ and its bonnet-head $a^{12}$, and said bar provided with a channel $f^5$ extending longitudinally therethrough, as shown in Fig. 12. A packing-blade $f^6$ fits the slotted opening $a^{11}$, said blade being the same length as the bar $f^4$ and having a ledge $f^7$ to fit within the channel $f^5$ and rest upon upwardly curved springs $f^8$, $f^8$ which are secured to said bar by screws $f^9$, $f^9$. To prevent displacement of the blade $f^6$ on the bar $f^4$, said blade has each end of its ledge $f^7$ projecting rearward to form lateral extensions $f^{10}$, $f^{10}$ which are each provided with short elongated openings $f^{11}$, $f^{11}$ to receive therethrough pins $f^{12}$, $f^{12}$ whose ends are secured in the sides of said bar $f^4$, as shown in Figs. 12 and 13, thus when the blade $f^6$ is forced in contact with the peripheral surface of the rotor $c$ a yielding movement of the said blade structure is had to overcome the shock against said rotor and at the same time prevent the piston $f^1$ from striking against the inner head of its case $f$. In order that the cross-bar $f^4$ may move evenly throughout its forward and backward movements I provide two lifting-guides at each end of the cylinder-plate $e^3$, and in which $g^a$ is a disk which is bolted to said plate and having two oppositely disposed arms $g^1$, $g^1$ whose outer ends are bifurcated for connection with links $g^2$, $g^2$, and centrally of the disk $g^a$ in a stem $g^3$ whose outer end is also bifurcated for connection with similar links $g^4$, $g^4$, and the latter having their inner ends connected to the inner ends of said links $g^2$, and the inner end of the stem $g^3$ is made fast to said bar $f^4$, thus when steam forces the piston $f^1$ to carry its blade in contact with the rotor the links are brought to the dotted position shown in Fig. 12, and when steam is admitted to cause a reverse movement of the piston the said links will be brought to their full line position shown in said figure and the bar caused to come evenly in contact with the plate $e^3$ and the piston prevented from striking against the outer head $g^5$ of its case. A suitable packing is mounted in the case $f$ and surrounds the piston-rod $f^3$, as at $g^6$ in Fig. 5.

Referring to Figs. 5 and 9, the piston-case $f$ has an integral flat top portion, as at $f^{13}$, of a size to receive thereon an integral base $g^n$ of the cylinder $g$, and which top portion and base are secured together by bolts in the manner shown in said figures. The cylinder $g$ has its axis at a right angle to the axis of the case $f$ and longitudinally of the engine-cylinder, and said cylinder $g$ is divided by a transverse partition $g^7$ which is provided with a small centrally circular opening of a size to receive therethrough the valve-stem $g^8$, as at a point $g^9$. The portions of the valve-stem $g^8$ within the bores of the cylinder $g$ are flattened, as at points $g^{10}$, $g^{10}$, and on these flattened portions two rocker-valves $g^{11}$, $g^{12}$ are mounted and kept from displacement by means of screw-threaded heads $g^{13}$ and $g^{14}$ that engage interior threaded portions formed at each end of said cylinder $g$, the latter head being provided with a suitable stuffing-box, as $g^{15}$, to surround said stem as shown. In the side walls of the cylinder $g$ are formed two narrow steam-ducts $g^{16}$ and $g^{17}$ communicating with the rocker-valves $g^{11}$, $g^{12}$ respectively, and which ducts extend from at a point near to and below the valve-axis of said cylinder, and each duct registering with a similar size duct formed through the case $f$ and communicating with its piston-bore at each end thereof. The rocker-valve $g^{11}$ has a long segmental bearing-surface $g^{18}$ of a length sufficient to close one of the steam-ducts of its cylinder $g$ and leave open the opposite duct, in the manner shown in Fig. 5, and also a narrow upper wall $g^{19}$ extending longitudinally of said valve and arranged to permit live steam to enter from a small steam-pipe $g^{20}$ and pass through steam-passages left by the cutaway portions between said wall and said bearing-surface, as at points $g^{21}$, $g^{21}$, and enter through either duct $g^{16}$, $g^{17}$, according to the swing-movement of said valve. The rocker-valve $g^{12}$ has a long segmental bearing-surface, as at a point $g^{22}$ at the right of Fig. 6, of a length sufficient to close one of the steam-ducts of its cylinder $g$ and leave open the opposite duct, in order that the cutaway portion between the ends of said bearing-surface may act as a steam-passage $g^{23}$ to receive the exhaust-steam from the piston-case $f$ and pass from either duct $g^{16}$, $g^{17}$ out through a small exhaust-pipe $g^{24}$ which communicates with the main exhaust-pipe $e^2$. Each pair of valves $g^{11}$, $g^{12}$ receives its oscillating motion by means of a large spur gear $g^{25}$ keyed on the engine-shaft $a$, as shown in Figs. 4 and 5, and which gear meshes with a small spur gear $g^{26}$ loose upon a stud $g^{27}$ made fast in the engine-cylinder-bonnet $a^{12}$, said gear $g^{26}$ having a pin $g^{28}$ projecting beyond its axial center for connection with the ends of rods $g^{29}$, $g^{29}$, whose opposite ends are attached to upwardly extending arms $g^{30}$, $g^{30}$ secured on the stems $g^8$, $g^8$ of each pair of rocker-valves, in the manner shown in Fig. 2. The small steam-pipe $g^{20}$, which leads from each rocker-valve-cylinder $g$, unites with an inverted T-shaped connection $g^{31}$ having a short branch steam-pipe connection $g^{32}$ to the overhead main steam-pipe $s$, and in this branch-pipe $g^{32}$ is mounted a throttle-valve $g^{33}$ for regulating the flow of steam to operate the jumper-pistons.

Referring to Fig. 5, the type of rocker-valve $g^{11}$ is located at the points designated by reference numerals 1, 1, 1, 1 in Fig. 1, while the type of rocker-valve $g^{12}$ is located at the points 2, 2, 2, 2 in said latter figure, thus when steam is admitted to operate the jumper-pistons one pair of oppositely located valves $g^{11}$, $g^{12}$ (Fig. 5) cause the main steam pressure from the throttle-valve $d^{12}$ to be cut off at a point between the steam-abutments of the rotor $c$, the next adjacent pair of oppositely located rocker-valves $g^{12}$, $g^{11}$ (Fig. 6) are in position to carry the piston-blades $f^6$, $f^6$ free from the main steamways $i$, $i$ in the engine-cylinder.

Referring to Figs. 16 and 23, a shaft $h^1$ has its ends loosely mounted in the solid heads of each engine-cylinder $b$ and $b$, as at points $h^2$, $h^2$, and on said shaft is centrally secured two alike levers $h^3$, $h^3$ whose ends are bifurcated to connect with links $h^4$, $h^4$, which have their opposite ends secured in the bifurcated portions of vertical rods $h^5$, $h^5$, and each rod made fast in the upper part of each slide-valve $e^1$. On the shaft $h^1$ is made fast one end of a laterally projecting lever $h^6$ the outer free portion of which acts as a handle, as at $h$, and on said lever is mounted a headed stud $h^7$, located near its handle and passing through a slotted opening $h^8$ formed in a post $h^9$ having a base $h^{10}$, which is bolted to the engine-bed $h^{11}$. The stud $h^7$ has its free portion screw-threaded to receive thereon a thumb-screw $h^{12}$, which acts as a clamp to impinge against in holding said lever $h^6$ firmly in place upon said post. The opening $h^8$ in the post is in the form of an arc whose radius is struck from the center of the shaft $h^1$ and of a length to permit said lever to swing the slide-valves $e^1$ to their extreme upward or downward positions, to cause the engine or compound-engine to run right-hand or left-hand, as may be desired.

The upper part of each steam-chest $e$ is provided with a stuffing-box surrounding each rod $h^5$ of each slide-valve $e^1$, as shown in Fig. 16.

Beyond the gears $g^{25}$, $g^{26}$ for actuating the rocker-valves, the engine-shaft $a$ is mounted on the journal-bearings of pillow-blocks $j$, $j$, and the base of each block bolted to the engine-bed-plate $h^{11}$, as shown in Fig. 16.

In this construction of compound engine its co-axial shafts $a$, $a$ have each a hub $k$ made fast thereon and each hub has an integral annular flange, as $k^1$, $k^1$, which are secured together by bolts $l$, $l$, in the manner shown more clearly in Fig. 15. The bevel gears $d^8$, $d^8$, $d^9$ are each of equal size, and each pair of valves $d^1$, $d^1$ for one engine is positioned at a quarter turn of the pair of valves $d^1$, $d^1$ for the other engine, thus as one pair of said valves is taking steam the other pair is closed against steam. Each pair of valves $d^1$, $d^1$ is driven in opposite directions by means of the driving miter gear $d^9$, and each pair of said valves rotates at the same speed as the rotor $c$. Each rotor $c$ has its steam-abutments $c^4$, $c^4$ positioned a quarter way around from the rotor-abutments of the other engine. Each set of spur gears $g^{25}$, $g^{26}$, for actuating the steam cut off mechanism, is in ratio of two to one.

Having now described the structural parts of my improved engine I will proceed to explain its operation.

The small throttle-valve $g^{33}$ is first opened to permit steam from the small pipe $g^{20}$ to enter through the outer passage $g^{21}$ and passage $g^{23}$, provided respectively by the right and left hand rocker-valves shown in Fig. 5, through the outer ducts $g^{17}$, $g^{17}$ and force the jumper-piston-blades $f^6$, $f^6$ in contact with the peripheral surface of the rotor $c$ of high pressure engine A, and in the same manner cause the piston-blades of the low pressure engine $A^1$ to move free of its steamways $i$, $i$, as shown in Fig. 5. The main throttle-valve $d^{12}$ is next opened to start the compound engine, which, we will assume, rotates in the direction indicated by the arrows on the engine-shafts $a$, $a$, and the pair of slide-valves $e^1$, $e^1$, at the right side of the engine, held at their lowermost position, as shown in Fig. 16, while the opposite pair of slide-valves $e^1$, $e^1$, at the left side of the engine, is held at their uppermost position, as shown in Fig. 17.

Referring to Fig. 16, the live steam passes through one of the rotary-valve-ports $d^4$, at the right side of the high pressure engine, through the upper port $d^7$ in the cylinder of said valve, thence through the space left by the lower slide-valve $e^1$ and upper part of its chest, thence through the upper port $a^8$ of the engine-cylinder $b$, and against the top centrally-positioned steam-abutment $c^4$, shown in Fig. 5, and while the above steam action takes place the live steam operates in the same manner from the opposite rotary-valve of said high pressure engine, except that it passes from last mentioned valve through the lower port $d^7$ of the valve-cylinder, thence through the space between the lower slide-valve $e^1$ and its chest, thence through the lower left hand port $a^9$ of the engine-cylinder $b$, and against the bottom centrally-positioned steam-abutment $c^4$, as shown in said latter figure. Still referring to Fig. 5, as the rotor $c$ turns toward the left it expels the exhaust from the steamways $i$, $i$, in the direction indicated by the arrows $m$, $m$, through the diametrically opposite engine-cylinder-ports $a^8$, $a^9$, thence into and through each slide-valve $e^1$, $e^1$, and out through the main exhaust-pipes $e^2$, $e^2$. In the position of parts shown in Fig. 5, before the jumper-pistons reach their inner position as shown they expel the exhaust steam, from the pipes $g^{20}$, $g^{20}$, out through the inner ducts $g^{16}$, $g^{16}$, and the next adjacent pair of rocker-valves $g^{11}$, $g^{12}$ (Fig. 6) assume a position to permit said exhaust to pass out through the small pipe connections $g^{24}$, $g^{24}$ that communicate with the main exhaust-pipes $e^2$, $e^2$. After the steam-abutments $c^4$, $c^4$ of the rotor $c$, of this high pressure engine, has expelled the exhaust through the ports of the cylinder $b$, the small spur gear $g^{26}$ will have made a half revolution and thereby bring the rocker-valves $g^{12}$, $g^{11}$ to such position as to cause steam from the small pipes $g^{20}$, $g^{20}$ to force against the inner faces of and carry the jumper-pistons to the position shown in Fig. 10, and as soon as said pistons reach this position the steam-abutments $c^4$ will then be at their horizontal axial center of this engine, as seen in said figure, and prior to this position of parts the exhaust in front of said pistons will be expelled through the outer ducts $g^{17}$, $g^{17}$ and the adjacent rocker-valves $g^{11}$, $g^{12}$ (Fig. 11) at such position to permit said exhaust to pass through the short pipes $g^{24}$, $g^{24}$ to the main exhaust-pipes $e^2$, $e^2$.

As the live steam passes into the upper right-hand engine-cylinder-port $a^8$ and out through the diametrically opposite lower left-hand port $a^9$ to drive the rotor of the high pressure engine, as in Fig. 5, the exhaust from the cylinder $b$ of said engine operates in the same manner through the alike ports, to drive the rotor of the low pressure engine, the worked steam finally passing out through pipes $x$, $x$ secured in the steam-chests of the latter engine and communicating with the atmosphere. As soon as the steam-abutments pass beyond the ports $a^8$, $a^9$ the rocker-valves are so timed to respectively expel the exhaust and permit a full steam pressure to force the jumper-pistons inwardly together and cause their blades to instantly cut off the main steam pressure from the main exhaust in the engine-cylinder, and when said abutments reach said ports said valves act in the same manner to cause said blades to simultaneously withdraw from the main steamways for the travel of said abutments.

The cylinder-valves $d^1$, of the low pressure engine $A^1$, are adapted to cut off steam very early, in order to permit the steam-expansion to perform its work for the remaining part of revolution of the rotor of this engine.

For a single engine the coupling, formed by the hub-flanges $k$, $k^1$, may be dispensed with and the exhaust-pipes $e^2$, $e^2$ lead direct to a large pipe for communicating with the atmosphere.

What I claim and desire to secure by Letters Patent, is—

1. In a rotary steam-engine, the combination of a stationary cylinder provided with two ports at each side thereof; an engine-shaft; a rotor fast on said shaft, concentric with and of lesser diameter than the cylinder so as to provide steamways from said ports, and said rotor having two oppositely disposed and longitudinally arranged steam-abutments provided each with a spring-pressed packing-blade to bear against the bore of the cylinder; two rotary-valves arranged to receive the main steam pressure therethrough; a gearing arrangement driven by the shaft to rotate said valves at the same speed as the rotor; a slide-valve interposed between two ports leading from each rotary-valve and each said pair of ports in the cylinder; means to hold one slide-valve at its one extreme of movement while the other slide-valve is held at its other extreme of movement in order that the steam may enter through the upper or lower port of a pair at one side of the cylinder and against one rotor-abutment while the other slide-valve permits the steam to pass through the upper or lower port diametrically opposite the first mentioned port and against the other rotor-abutment, and a jumper-piston mechanism mounted on each side of the cylinder, actuated by the engine-shaft and driven by steam to respectively cut off the main pressure simultaneously at points between each pair of the cylinder-ports, and permit the main exhaust to pass from the steamways through the remaining two diametrically opposite ports, into and from the slide-valves.

2. In a rotary steam-engine, the combination of a cylinder having an integral head provided with two ports at each side of the cylinder, each port located near to the horizontal axis of the latter, and said cylinder having integral flange-heads provided each with a narrow longitudinally arranged slotted opening; a fixed bonnet inclosing the open end of the cylinder; an engine-shaft; a rotor fast on the shaft and concentric with the cylinder, of lesser diameter than the latter in order to leave a steamway communicating with the ports; a spring-pressed packing-ring mounted in each face of the rotor to bear against the head of the cylinder and bonnet of the latter; two fixed steam-abutments mounted opposite each other on the rotor and longitudinally thereof; a spring-pressed packing-blade in each abutment to bear against the bore of the cylinder; two rotary-valves arranged to receive the main steam pressure; means to rotate said valves at the same speed as the rotor; a slide-valve interposed between each pair of cylinder-ports and two ports leading from each rotary-valve; two jumper-pistons having each a rod-connection with a cross-bar slidable in each opening of the flange-heads of the cylinder; a spring-pressed packing-blade carried by each cross-bar; means to move each cross-bar evenly in each opening of the flange-heads; means to automatically permit steam to force the piston-blades in contact with the peripheral surface of the rotor when the main pressure may then pass from one pair of diametrically opposite cylinder-ports and against the rotor-abutments while the other pair of diametrically opposite cylinder-ports discharges through the slide-valves, and the piston-blades then brought free of the steamways for another operation of the main steam pressure.

3. In a rotary steam-engine, the combination of a stationary cylinder provided with a pair of ports, at each side of the cylinder, and through its head and centrally of and near to the horizontal axis of said cylinder, and the latter provided with oppositely arranged slotted openings extending between each pair of ports; an engine-shaft having its axial center on the axis of the cylinder; a bonnet inclosing the open end of the cylinder; a circular rotor centrally mounted on the shaft and carrying two oppositely disposed steam-abutments; a spring-pressed packing-ring mounted in each face of the rotor; a spring-pressed packing-blade mounted in each abutment of the rotor; jumper-pistons whose rods carry cross-bars to slide in the slotted openings of the cylinder; a spring-pressed packing-blade carried by each bar to contact with the peripheral surface of the rotor; means actuated by the shaft to permit the main steam pressure to enter through two of the diametrically opposite ports and against one side of the abutments while the steam at the other side of the abutments exhaust through the remaining two diametrically opposite ports, and means actuated by the shaft to permit a steam pressure to simultaneously withdraw the pistons so that their blades become free of contact with the rotor and path of its abutments.

4. In a rotary steam-engine, the combination of a stationary cylinder provided with ports in its head and also having an integral flange-head provided with a slotted opening centrally of the ports; a bonnet to close the open end of the cylinder; an engine-shaft; a rotor fast on said shaft and carrying oppositely disposed steam-abutments; a spring-pressed-blade in each abutment; a steam-chest secured to the cylinder; a steam case secured to the chest and provided with ports; a slide-valve closing one port of the cylinder and leaving open one port of the case; a valve-shaft; a rotary-valve mounted in the case and provided with ports to receive the main steam pressure; a bevel gear fast on the engine-shaft; a bevel gear fast on the valve-shaft and in mesh with the first mentioned gear; a plate made fast on the flange-head; a steam-piston-case mounted on the plate and provided with a piston-bore having a narrow port at each end thereof; a jumper-piston having a rod-connection with a cross-bar slidable in the slotted opening; a spring-pressed blade carried by the bar; a small steam-cylinder mounted on the steam-case and having a transverse partition so as to provide two steam-chambers and each having oppositely arranged narrow ports communicating with the ports in said piston-case; a valve-stem through the chambers of the small cylinder; a steam-pipe communicating with one chamber; a rocker-valve fast on the stem and having a large bearing-surface to close one port in its rocking movement and also having a wall dividing two cutaway passages, for steam to enter one or the other, according to the rocking movement of said valve; an exhaust-pipe from the other chamber; a second rocker-valve fast on the stem and having a large bearing-surface to close one port in its rocking movement and also a cutaway passage for the exhaust to clear from; a large spur gear fast on the engine-shaft; a stud fast in the cylinder-bonnet; a small spur gear loose on said stud and in mesh with first mentioned spur gear; a pin secured in and beyond the axial center of second mentioned spur gear; an arm having one end fast on the valve-stem; a rod-connection from the free end of said arm to the pin of small spur gear, and means to carry the cross-bar evenly in its movement from the engine-cylinder.

5. In a rotary steam-engine, the combination of a stationary cylinder provided with two ports arranged diametrically opposite each other and an exhaust-port near each steam-port, and said cylinder having integral projecting flange-heads provided each with a long slotted opening centrally of each steam-port and exhaust-port; a driving-shaft; a circular rotor fast on said shaft, concentric with the cylinder and having oppositely disposed steam-abutments; means to keep the end faces and abutments of the rotor steam-tight; two steam-chests; a slide-valve in each chest to admit the main steam pressure against two diametrically opposite faces of the abutments while the exhaust passes through each valve; two valve-cylinders provided each with two ports communicating with each chest; a rotary-valve in each last mentioned cylinder and each rotary-valve driven by power to admit the main pressure through the steam-ports of the first mentioned cylinder; jumper-pistons whose rods have each a cross-bar slidable in the opening of each flange-head, and each bar provided with a packing-blade; rocker-valves; and means actuated by the driving-shaft to move last mentioned valves, to admit steam to the front and exhaust from the rear of each piston to respectively force each blade in contact with the peripheral surface of the rotor, at such time when its abutments leave the steam-ports of first mentioned cylinder and withdraw the blades from the path of said abutments when the latter reach the exhaust-ports of said first mentioned cylinder.

6. In a rotary steam-engine, the combination of a stationary cylinder provided with two steam-ports arranged diametrically opposite each other and an exhaust-port near each steam-port, and said cylinder having integral flange-heads provided each with a slotted opening extending the length of the bore of the cylinder and centrally of each steam-port and each exhaust-port; an engine-shaft; a circular rotor fast on said shaft and carrying oppositely disposed spring-pressed steam-abutments to contact with the bore of said cylinder; steam-chests; rotary-valves arranged to deliver the main steam pressure through said chests; means actuated by the shaft to rotate said valves; jumper-pistons, each having a rod-connection with a cross-bar which is provided with a spring-pressed packing-blade; a slide-valve in each chest, so positioned that the main steam pressure is admitted over one valve and against the face of one abutment while the pressure is admitted under the other valve and against the opposite face of the other abutment, and the exhaust out from within each valve; means to move each slide-valve simultaneously to cause the engine to run in either direction; a rocker-valve to admit steam against each piston and cause the blade of the latter to contact with the peripheral surface of the rotor after its abutments pass the steam-ports; a rocker-valve to cause steam to exhaust from each piston in the withdrawal of the blades from the path of the abutments, and means actuated by the shaft to operate said rocker-valves.

7. In a rotary steam-engine, the combination of a stationary cylinder provided with four ports through its head, and in which two form inlets diametrically opposite each other, and the other two outlets located near to said inlets, and said cylinder provided with a slotted opening centrally of each inlet and outlet port; a driving-shaft; a circular rotor fast on said shaft and carrying two oppositely disposed steam-abutments which project through steamways continuous from the ports; a packing-blade carried by each abutment to contact with the bore of said cylinder; a packing-ring mounted in each face of the rotor to contact with the cylinder-head and its bonnet; means to automatically admit the main seam pressure through the inlets and against one side of the abutments, and to exhaust from the other side of the latter, through the outlet-ports; jumper-pistons having each a rod-connection with a cross-bar slidable in the opening of each flange-head; a packing-blade carried by the bar; means actuated by the shaft to respectively permit steam to force the piston-blades in contact with the peripheral surface of the rotor, and withdraw said blades from the steamways of the cylinder, means to cause the bars to slide evenly in their reciprocating movement, and means to reverse the rotation of the engine.

8. In a rotary steam-engine, the combination of a driving-shaft; a circular rotor fast on said shaft and carrying oppositely arranged steam-abutments; a cylinder concentric with the rotor and provided with two steam-ports in its head, located diametrically opposite each other, and an exhaust-port near each steam-port, and said cylinder having projecting flange-heads provided each with a narrow slotted opening centrally of each steam-port and each exhaust-port; a bonnet inclosing the rotor; valve-cases, each communicating with a main steam-pipe, and each case provided with two inlets; steam-chests between the valve-cases and cylinder and each case communicating with an exhaust-pipe; a rotary-valve in each case and arranged to deliver the steam pressure through either inlet; means actuated by the shaft to rotate each rotary-valve at the same speed; a slide-valve in each chest and communicating with each exhaust-pipe; means to carry the slide-valves to their extreme opposite positions in order that the steam may pass through the steam-ports and against the abutments, and jumper-pistons having each a rod-connection with a cross-bar slidable in the opening of each flange-head, and each piston provided with a packing-blade, and each piston driven by steam and actuated by the shaft to respectively cut off the pressure in the cylinder after the abutments pass over the steam-ports and to release the blades when the abutments reach the exhaust-ports.

9. In a rotary steam-engine, the combination with the driving-shaft; a circular rotor concentrically mounted and made fast on the shaft, said rotor having a deep annular wall provided with two oppositely arranged and longitudinally extending dovetail grooves formed in its peripheral surface and also provided with a circular channel formed in each face of said wall; steam-abutments, each having a ledge to fit in each groove of the rotor-wall, and each abutment provided with a longitudinally arranged channel; a series of springs secured in the channel of each abutment and each spring having its free portions curving upwardly; a packing-blade having a narrow ledge to fit within the channel and rest upon the springs of each abutment; a second series of springs secured in the channels of the rotor-wall and each spring having its free portions curving outwardly, and a circular packing-ring having a central ledge to fit within the channel and rest upon the springs of said rotor-wall.

10. In a rotary steam-engine, the combination with the driving-shaft carrying a rotor which has steam-abutments mounted thereon, of a stationary cylinder having a flange-head provided with an opening therethrough, and also a steam-port and an exhaust-port outwardly from said opening and in the path of the rotor-abutments; a valve-shaft; a rotary-valve fast on last said shaft and arranged to permit the main pressure to enter against the steam-abutments; a bevel gear fast on last said shaft; a second bevel gear fast on the driving-shaft and in mesh with first said gear; a slide-valve between said rotary-valve and said cylinder and arranged to discharge the exhaust therefrom; a plate secured on the flange-head and provided with a small centrally arranged opening; a small cylinder mounted on said plate and provided with a duct at each end of its bore; a jumper-piston having a rod-connection through the opening of said plate and carrying a cross-bar slidable in the opening of the flange-head; a case mounted on the small cylinder and provided with two chambers each communicating with oppositely arranged ducts that lead to the ducts in said small cylinder; a steam-pipe to one chamber; an exhaust-pipe to the other chamber; a valve-stem; a rocker-valve fast on said stem and having a bearing-surface to cover one duct in said case and provided with two steam-passages to deliver the pressure through one or the other of said ducts; a second rocker-valve fast on said stem and having a large bearing-surface to cover one duct in the other chamber of said case and provided with one steam-passage for the exhaust to pass from, and a gearing arrangement to operate said rocker-valves.

11. In a steam-engine, the combination with two co-axially arranged driving-shafts coupled together, a rotor fast on each shaft and each rotor having a pair of oppositely disposed steam-abutments, and one pair being located a quarter way around from the other pair, a stationary cylinder concentric of each rotor, one cylinder acting as a high-pressure and the other acting as a low-pressure, each cylinder provided with two inlets arranged diametrically opposite each other to receive the main pressure therethrough and an outlet for the exhaust near each inlet, and each cylinder having a pair of oppositely-projecting flange-heads provided each with a slotted opening extending centrally of each inlet and exhaust; a pair of steam-chests on each cylinder and communicating with the inlets and exhausts of the latter; a pair of valve-cylinders on the chests and each valve-cylinder provided with two ports communicating with the latter; exhaust-pipes leading from the chests of the high-pressure cylinder to the valve-cylinders of the low-pressure cylinder; a rotary-valve in each valve-cylinder, each rotary-valve for one main-cylinder provided with two ports located a quarter way around from the two ports in the pair of rotary-valves for the other main-cylinder; a slide-valve in each chest to communicate with either inlet or exhaust of the main-cylinders; means to carry one pair of slide-valves at one side of the engine to a position opposite of the pair at the other side to reverse the movement of the engine; a plate mounted on the flange-heads of each main-cylinder; a jumper-piston having a rod-connection with a cross-bar slidable in the opening of each flange-head; a packing-blade carried by each bar; and means to automatically force by steam pressure the blades of one pair of pistons in contact with a rotor while the blades of the next pair of pistons withdraw from the path of the steam-abutments of the other rotor, and means to cause each cross-bar to slide evenly in its reciprocating movement, substantially as shown and described.

In testimony whereof I affix my signature in presence of two witnesses.

OSCAR O. NYGAARD.

Witnesses:
C. T. HANNIGAN,
JAMES M. GILLRAIN.